United States Patent Office 3,144,480
Patented Aug. 11, 1964

3,144,480
ESTERS OF γ-(2,4,5-TRICHLOROPHENOXY)-
BUTYRIC ACID
Donald E. Small, Oreland, Pa., assignor to Amchem Products, Inc., Ambler, Pa., a corporation of Delaware
No Drawing. Filed June 5, 1961, Ser. No. 114,674
6 Claims. (Cl. 260—473)

The present invention relates to esters of γ-(2,4,5-trichlorophenoxy)-butyric acid and is particularly concerned with compounds having the formula:

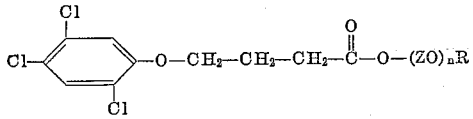

wherein Z is selected from the group consisting of ethylene and propylene radicals, $n$ is an integer from 1 to 3, inclusive, and R represents an alkyl radical containing from 1 to 4 carbon atoms, inclusive.

In the north temperate zone extensive acreages are devoted to the growing of trees for lumbering purposes. One of the most important varieties grown in this respect is the Douglas fir which, because of its quality and size, has come to be a basic source of lumber for the construction industry. The main problem encountered in growing the Douglas fir is that of competition with other less desirable woody species. Serious infestation of these fir stands, particularly by the vine maple specie, are frequently encountered so that eradication or control of this undesirable plant presents a major problem to this industry.

The object of the present invention is to provide novel esters of γ-(2,4,5 - trichlorophenoxy) - butyric acid which are capable of selectively eradicating or suppressing growth of undesirable woody species without causing any deleterious effect on Douglas fir trees.

The present invention is based upon the surprising discovery that glycol and polyglycol alkyl ether esters of γ-(2,4,5-trichlorophenoxy)-butyric acid are capable of selectively eradicating certain woody species without harm to Douglas fir trees, and moreover are also capable of destroying parasitic shrubs, particularly of the mistletoe variety, growing on the Douglas fir. This discovery is highly surprising in view of the fact that both 2,4,5-trichlorophenoxy acetic acid and the glycol esters thereof are widely used as total brush killers, and are well known to cause severe damage to Douglas fir trees. This invention is all the more surprising when it is realized that the γ-(2,4-dichlorophenoxy)-butyric acid and the glycol esters thereof demonstrate virtually total woody plant control with no trace of selectivity in favor of the Douglas fir variety. This highly unexpected and unpredicted property of the γ-(2,4,5-trichlorophenoxy)-butyric acid glycol esters has been found to exist only in these particular esters, the other functional derivatives as well as the parent acid not being found to possess this remarkable selectivity.

The compounds of the present invention may be prepared by reacting approximately equal molar amounts of γ-(2,4,5-trichlorophenoxy)-butyric acid and a glycol or a polyglycol monoalkyl ether of the formula:

R(OZ)$_n$OH wherein R, Z and $n$ are as described above. The esterification reaction is preferably carried out in the presence of a small molar excess of the glycol ether and preferably, but not necessarily, in the presence of an esterification cation catalyst, such as for example sulfuric acid or an aryl sulfonic acid. If desired an inert solvent may be employed to facilitate water removal during the reaction cycle, and where employed, the solvent may be removed by distillation under reduced pressure.

The following examples are presented to illustrate the invention, but are in no way intended to be construed as a limitation thereof:

EXAMPLE 1

*Butoxyethyl Ester of γ-(2,4,5-Trichlorophenoxy)-Butyric Acid*

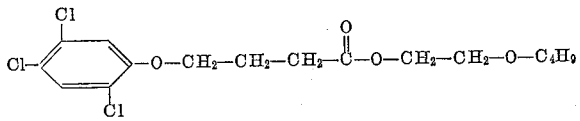

24.5 grams (0.085 mol) of γ-(2,4,5 - trichlorophenoxy)-butyric acid and 11 grams (0.093 mol) of butoxy ethanol were added, with agitation, to a flask equipped with a reflux condenser. Two drops of concentrated (98%) sulfuric acid was added to the flask and heat was applied to the mixture. Starting at about 120° C. a mixture of water and butoxy ethanol was collected from the condenser. This mixture was separated and the organic phase was recycled to the reaction mixture. The esterification reaction was continued for approximately four hours during which the time the pot temperature rose to about 160° C. After this reaction cycle vacuum was applied to recover low boiling fractions and this stripping operation was continued at about 20 millimeters pressure until no additional distillate was recovered. The reaction vessel was then cooled to recover the crude butoxyethyl ester of γ-(2,4,5-trichlorophenoxy)-butyric acid. The product was washed with dilute sodium carbonate solution and dried over anhydrous sodium sulfate. The oily liquid had a specific gravity (25°/25°) of 1.262 and an index of refraction ($n/D$) of 1.520 @ 25° C.

EXAMPLE 2

*Butoxyethoxypropyl Ester of γ-(2,4,5-Trichlorophenoxy)-Butyric Acid*

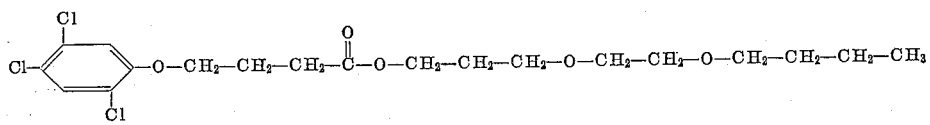

28.3 grams (0.1 mol) of γ-(2,4,5-trichlorophenoxy)-butyric acid and 19.5 grams (0.11 mol) of butoxyethoxypropanol were added to a flask. One drop of concentrated sulfuric acid was added and the mixture was heated with agitation to a temperature of about 120° C. Water of reaction and butoxyethoxypropanol were condensed and separated, the organic phase being returned to the reaction vessel. After about 4 hours the esterification was considered to be essentially complete as measured by the amount of water recovered from the reaction, and vacuum was applied to recover low boiling fractions. This stripping operation was continued until no further distillate was recovered at 20 mm. pressure. After cooling, the crude ester was washed with dilute sodium carbonate solution and subsequently dried over anhydrous sodium sulfate. The oily liquid product was found to have an index of refraction ($n/D$) of 1.5018 at 25° C. and a specific gravity (25°/25°) of 1.184.

EXAMPLE 3

*Ethoxyethyl Ester of γ-(2,4,5-Trichlorophenoxy)- Butyric Acid*

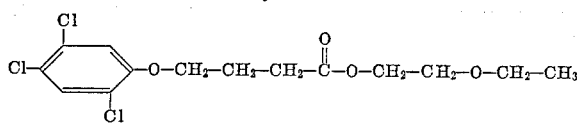

100 grams (0.35 mol) of γ-(2,4,5-trichlorophenoxy)-butyric acid, 34.2 grams (0.38 mol) of 2-ethoxyethanol and 2 drops of concentrated sulfuric acid were mixed together in a flask and heated to a temperature of about 120° C. A mixture of water and 2-ethoxyethanol which was collected starting about this temperature, was separated with the 2-ethoxyethanol being returned to the reaction vessel. The esterification reaction was continued for approximately 3½ hours during which time the temperature rose to about 160° C. Upon completion of the reaction cycle, as evidenced by the fact that water ceased to be evolved, vacuum was applied to recover low boiling fractions and the stripping operation was continued at 20 mm. pressure until no additional distillate was recovered. The reaction vessel was then cooled to recover the crude 2-ethoxyethyl ester which was then washed with dilute sodium carbonate solution and dried over anhydrous sodium sulfate. The oily liquid product was found to have an index of refraction ($n/D$) of 1.5240 at 24° C. and a specific gravity of 1.301 at 26° C.

EXAMPLE 4

*Methoxyethoxyethyl Ester of γ-(2,4,5-Trichlorophenoxy)-Butyric Acid*

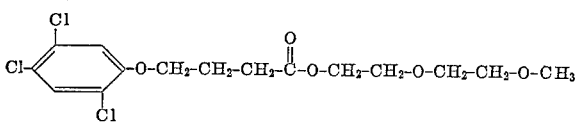

100 grams (0.35 mol) of γ-(2,4,5-trichlorophenoxy)-butyric acid and 45.6 grams (0.38 mol) of methoxyethoxyethanol were reacted together in the presence of 2 drops of concentrated sulfuric acid according to the procedures outlined in Example 3 above. Upon completion of the reaction cycle the crude product was washed with a dilute sodium carbonate solution and dried over anhydrous sodium sulfate. The oily methoxyethoxyethyl ester of γ-(2,4,5-trichlorophenoxy)-butyric acid was found to have a refractive index ($n/D$) of 1.5315 at 26° C. and a specific gravity of 1.338 at 24° C.

In addition to the foregoing examples, one molecular portion 1-butoxy-2-propanol was reacted with one molecular portion of γ-(2,4,5-trichlorophenoxy)-butyric acid to prepare the butoxypropyl ester of γ-(2,4,5-trichlorophenoxy)-butyric acid as an oily liquid which was found to be soluble in benzene, xylene and acetone and substantially insoluble in water.

As an example of the highly surprising and unexpected herbicidal selectivity of the compounds of this invention there is presented below a comparison of actual field results obtained from the use of the butoxyethylester of γ-(2,4,5-trichlorophenoxy)-butyric acid resulting from Example 1, as well as results from similar analogs and homologs of this compound. The compounds were applied as drenching sprays to seedling trees (1.5 to 3 feet tall) of the varieties shown at a rate of 4 lbs. active acid ingredient/100 gallons of water. The reported results were obtained during the growing season approximately three months after application, and are recorded as the percent kill obtained on the respective varieties.

The compounds reported in the table are identified by the following key:

A=butoxyethylester of γ-(2,4,5-trichlorophenoxy)-butyric acid.
B=butoxyethylester of γ-(2,4-dichlorophenoxy)-butyric acid.
C=butoxyethylester of 2,4,5-trichlorophenoxyacetic acid.
D=2,4,5-trichlorophenoxyacetic acid.

TABLE

| Plant Specie | Control | Compound Used | | | |
| --- | --- | --- | --- | --- | --- |
| | | A | B | C | D |
| Douglas fir | 0 | 0 | 92 | 100 | 100 |
| Vine maple | 20 | 94 | 90 | 100 | 100 |
| Red alder | 0 | 100 | 100 | 100 | 100 |
| Big leaf maple | 1 | 100 | 89 | 100 | 100 |

I claim:

1. Esters of γ-(2,4,5-trichlorophenoxy)-butyric acid having the formula:

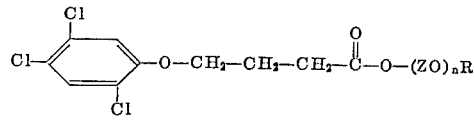

wherein Z is selected from the group consisting of ethylene and propylene, $n$ is an integer of from 1 to 3, inclusive, and R represents an alkyl radical of 1 to 4 carbon atoms, inclusive.

2. The butoxyethyl ester of γ-(2,4,5-trichlorophenoxy)-butyric acid.
3. The butoxyethoxypropyl ester of γ-(2,4,5-trichlorophenoxy)-butyric acid.
4. The ethoxyethyl ester of γ-(2,4,5-trichlorophenoxy)-butyric acid
5. The methoxyethoxyethyl ester of γ-(2,4,5-trichlorophenoxy)-butyric acid
6. The butoxypropyl ester of γ-(2,4,5-trichlorophenoxy)-butyric acid.

References Cited in the file of this patent

UNITED STATES PATENTS

| | | |
| --- | --- | --- |
| 2,523,189 | Britton et al. | Sept. 19, 1950 |
| 2,523,228 | Mullison | Sept. 19, 1950 |
| 2,668,104 | Eastman | Feb. 2, 1954 |
| 2,749,360 | Williams | June 5, 1956 |
| 2,759,965 | Begin | Aug. 21, 1956 |
| 2,761,774 | Davie | Sept. 4, 1956 |

OTHER REFERENCES

Wain: J. Agr. Food Chem., 3, 128–30 (1955).
Wain et al.: Proc. Roy. Soc. (London), B 142, 525–36 (1954).
Luckwill et al.: Chem. Abstracts, 53: 10641e (1959).